(12) United States Patent
Higashi et al.

(10) Patent No.: US 9,969,302 B2
(45) Date of Patent: May 15, 2018

(54) WALK-IN SEAT

(71) Applicant: SHIROKI CORPORATION, Fujisawa-shi (JP)

(72) Inventors: Nobumasa Higashi, Fujisawa (JP); Munetomo Kumamoto, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 254 days.

(21) Appl. No.: 14/852,324

(22) Filed: Sep. 11, 2015

(65) Prior Publication Data
US 2017/0072817 A1  Mar. 16, 2017

(51) Int. Cl.
*B60N 2/20* (2006.01)
*B60N 2/30* (2006.01)

(52) U.S. Cl.
CPC .............. *B60N 2/20* (2013.01); *B60N 2/3011* (2013.01)

(58) Field of Classification Search
CPC ................................ B60N 2/20; B60N 2/3011
USPC ...................................... 297/378.1
See application file for complete search history.

(56) References Cited

U.S. PATENT DOCUMENTS

| 7,857,392 | B2* | 12/2010 | Hayakawa | B60N 2/206 297/378.1 |
| 7,871,128 | B2* | 1/2011 | Bonk | B60N 2/2358 297/378.1 |
| 9,205,766 | B2* | 12/2015 | Yamada | B60N 2/235 |
| 9,566,880 | B2* | 2/2017 | Yamaguchi | B60N 2/68 |
| 2006/0181133 | A1* | 8/2006 | Sugama | B60N 2/0296 297/378.1 |
| 2012/0228913 | A1 | 9/2012 | Hurst et al. | |

* cited by examiner

*Primary Examiner* — Anthony D Barfield
(74) *Attorney, Agent, or Firm* — McGinn IP Law Group, PLLC

(57) ABSTRACT

A walk-in seat includes: a lower arm; an upper arm; a reclining mechanism; a shaft, which is rotatably provided to the lower arm; an operating lever, which is rotated with interlocking with the walk-in lever that is rotated by the walk-in operation; a rotation facilitating lever, which causes the shaft and the operating lever to further rotate with interlocking with a forward tilting operation of the upper arm; a stopper lever, which is held in the shaft with a play in a rotation direction and has a stopper portion; an insertion hole, through which the stopper portion being inserted; and a restriction portion, which is provided to the upper arm and abutted against the stopper portion to restrict a forward tilting operation of the upper arm to a predetermined amount.

6 Claims, 14 Drawing Sheets

WALK-IN SEAT

CROSS-REFERENCE TO RELATED APPLICATION

This application claims priority from Japanese Patent Application No. 2014-186517 filed on Sep. 12, 2014, the entire subject matter of which is incorporated herein by reference.

TECHNICAL FIELD

This disclosure relates to a walk-in seat which is able to move forward in a state where a seat back is tilted forwards and a lock mechanism of a slide rail in a locked state is unlocked.

BACKGROUND

For example, a seat, so-called a walk-in seat, for facilitating of getting on and off to a rear seat is provided as a passenger seat of a two-door vehicle having two rows of seats or a second-row seat of a vehicle having three rows of seats.

The walk-in seat is able to move forward in a state where a seat back is tilted forward and a lock mechanism of a slide rail is unlocked. As the seat is moved forward, it is easy to get on and off to a rear seat.

In the walk-in seat, when a seat back is tilted forward such that the seat back is overlapped on a seating face of a seat cushion and the seat is moved forward, a headrest provided on an upper portion of the seat back strikes an object (e.g., a dashboard in the case of a passenger seat, and a back portion of a first-row seat in the case of a second-row seat) on the front. Therefore, the walk-in seat may not move forward such that it is easy to get on and off to a rear seat.

Accordingly, a forward tilting position of a seat back at the time of performing a walk-in operation may be positioned between a normal use state of the seat back and a state where the seat back is overlapped on a seating face of a seat cushion.

US2012/0228913A1 discloses a mechanism for causing the forward tilting position of the seat back at the time of performing the walk-in operation to be positioned between the normal use state of the seat back and the state where the seat back is overlapped on the seating face of the seat cushion.

A seat disclosed in US2012/0228913A1 has the following two modes for the forward tiling of the seat back.

(1) A flat position mode in which the seat back is tilted forward such that the seat back is overlapped on the seating face of the seat cushion, and a back face of the seat back can be used as a table or the like.

(2) A walk-in mode in which the forward tilting position of the seat back is positioned between the normal use state of the seat back and the state where the seat back is overlapped on the seating face of the seat cushion.

Further, an upper arm that is a member of the seat back can be abutted against a stopper member, and the stopper member is displaced in and out a tilting trajectory of the upper arm. In this way, the forward tiling position of the seat back is changed.

The stopper member is provided to a lever for unlocking a lock mechanism of a seat rail. The lever is provided to a lower arm that is a member of the seat cushion. Furthermore, the lever is provided on a face opposite to a face, which faces the upper arm, of the lower arm. The stopper member can be abutted against the upper arm via an elongated hole formed in the lower arm.

SUMMARY

In US2012/0228913A1, the lever provided with the stopper member requires a considerable rotation amount in order to securely unlock the lock mechanism of the seat rail.

Therefore, the size of the elongated hole (insertion hole) of the lower arm, through which the stopper member is inserted, is increased, and thus the strength of the lower arm is lowered.

This disclosure has been made in consideration of the above problems and is to provide a walk-in seat that is capable of suppressing the strength reduction of the lower arm.

A walk-in seat of this disclosure includes: a lower arm, which is provided to a seat cushion side of a seat that is provided on a slide rail; an upper arm, which is provided to a seat back side of the seat and provided to be tiltable with respect to the lower arm; a reclining mechanism, which is configured to lock-and-unlock a tilting of the upper arm; a walk-in lever, which is rotatably provided to the lower arm and rotated by a walk-in operation to cause the reclining mechanism to be unlocked; a shaft, which is disposed in parallel with a center axis of the tilting and rotatably provided to the lower arm; an operating lever, which is attached to the shaft to rotate together with the shaft and rotated with interlocking with the walk-in lever that is rotated by the walk-in operation; a rotation facilitating lever, which is attached to the shaft to rotate together with the shaft and causes the shaft and the operating lever to further rotate with interlocking with a forward tilting operation of the upper arm; a stopper lever, which is held in the shaft with a play in a rotation direction and has a stopper portion extending in a direction intersecting with a rotation plane; an insertion hole, which is formed in the lower arm, the stopper portion being inserted through the insertion hole; a restriction portion, which is provided to the upper arm and abutted against the stopper portion to restrict the forward tilting operation of the upper arm to a predetermined amount; and an interlocking member, which interlocks the operating lever with a lock mechanism of the slide rail.

Other features of this disclosure will become more apparent from detailed description of the embodiments (to be described below) and the accompanying drawings.

According to the seat track device of this disclosure, since the stopper lever is held with respect to the shaft with a play in a rotation direction and has a stopper portion extending in a direction intersecting with a rotation plane, the stopper lever starts to rotate with a delay corresponding to the play, behind the operating lever and the shaft.

Therefore, the rotation amount of the stopper lever having the stopper portion is smaller than a rotation amount of the operating lever for operating a lock mechanism of a slide rail via a shaft or an interlocking member. Accordingly, it is possible to reduce the size of the insertion hole through which the stopper portion is inserted, and thus it is possible to suppress the strength reduction of the lower arm.

Other effects of this disclosure will become more apparent from detailed description of the embodiments (to be described below) and the accompanying drawings.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First, a whole configuration of a walk-in seat of the present embodiment will be described with reference to FIGS. 1 to 8. The walk-in seat of the present embodiment is applied to a second-row seat in three rows of seats.

Figure 1:
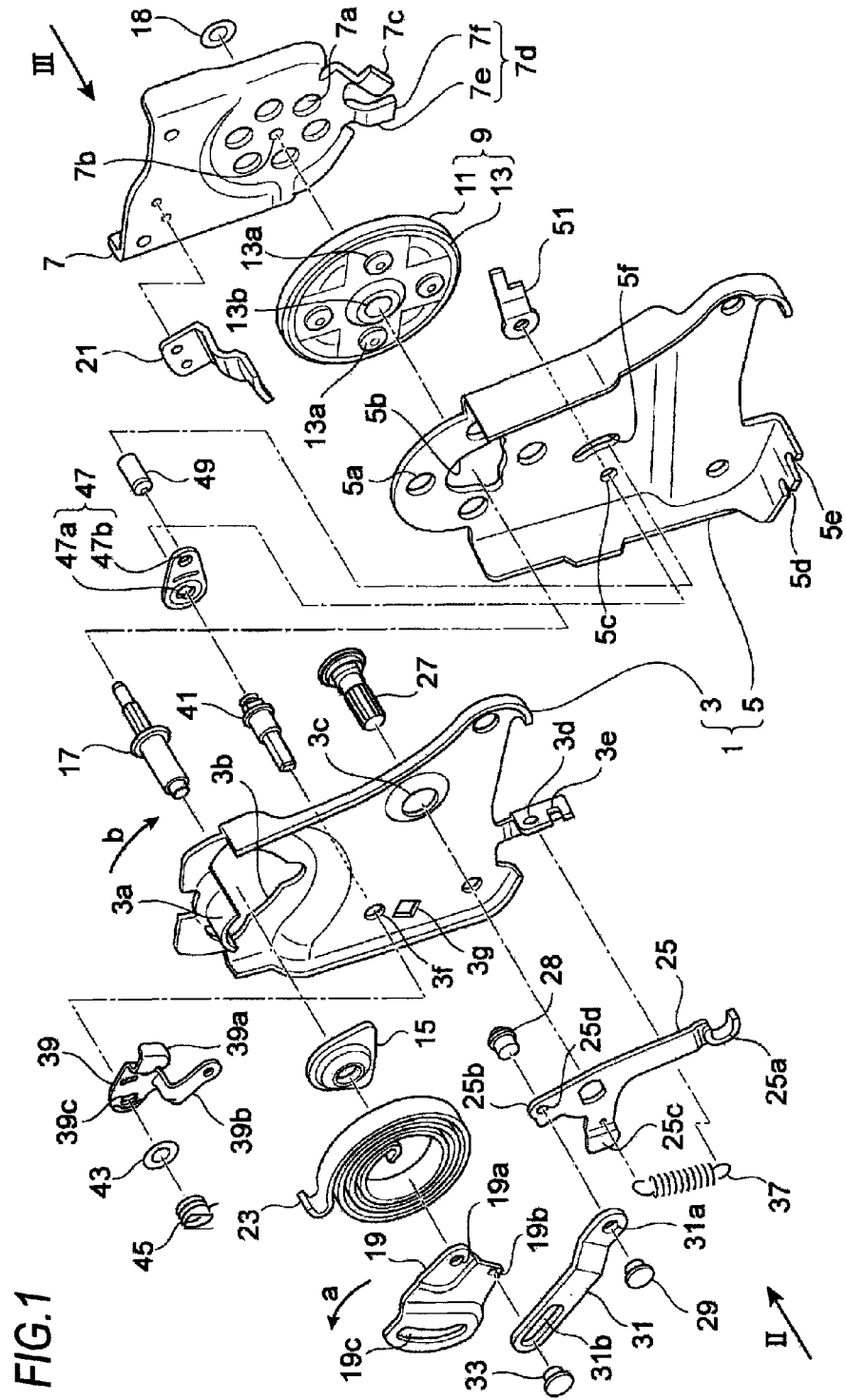
FIG. 1 is an exploded perspective view of a main portion of a walk-in seat according to the present embodiment.
Figure 2:
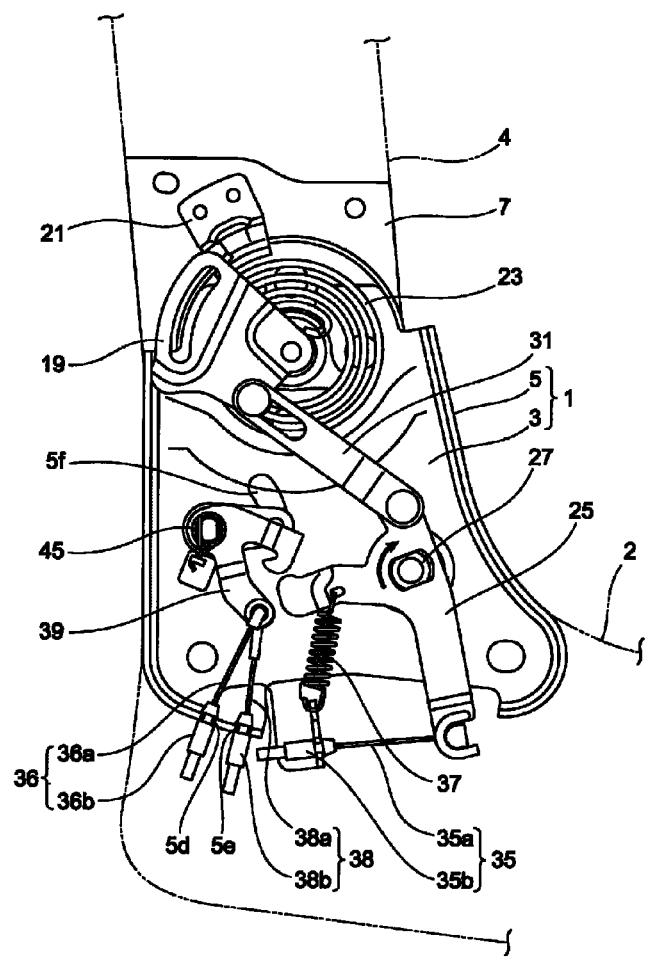
FIG. 2 is a view taken along a direction of an arrow II in FIG. 1.
Figure 3:
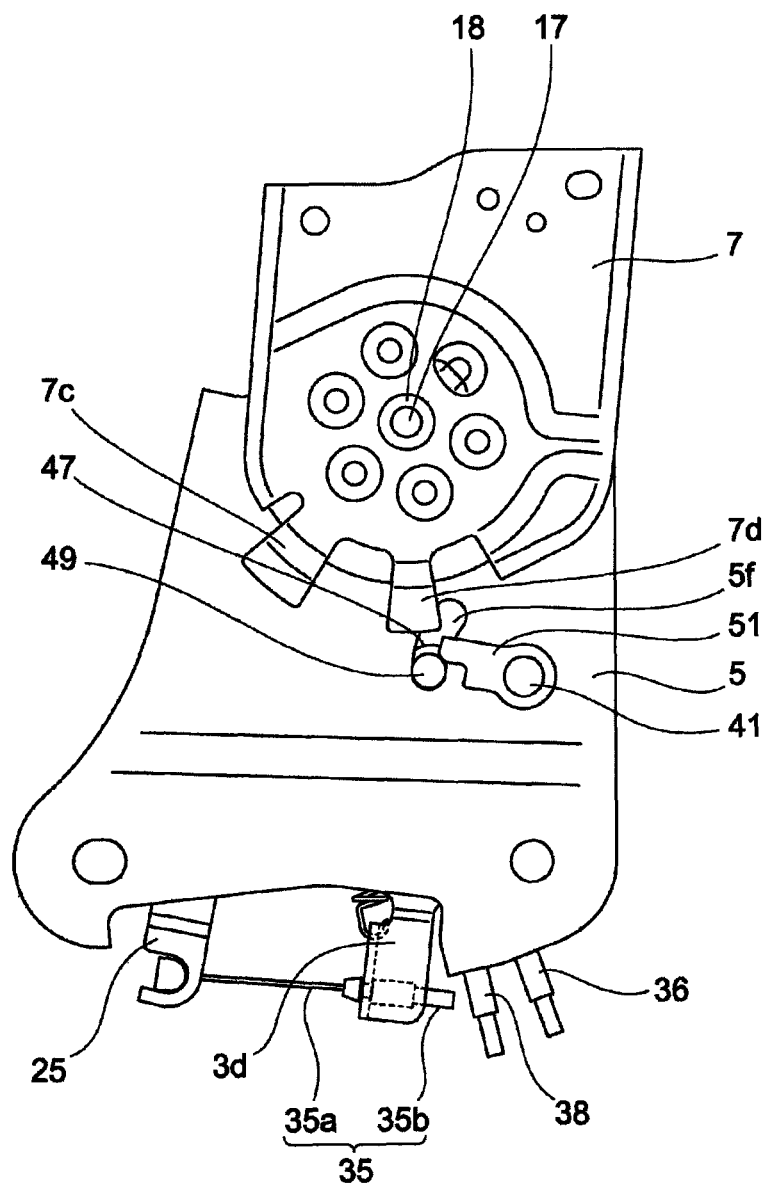
FIG. 3 is a view taken along a direction of an arrow III in FIG. 1.
Figure 4:
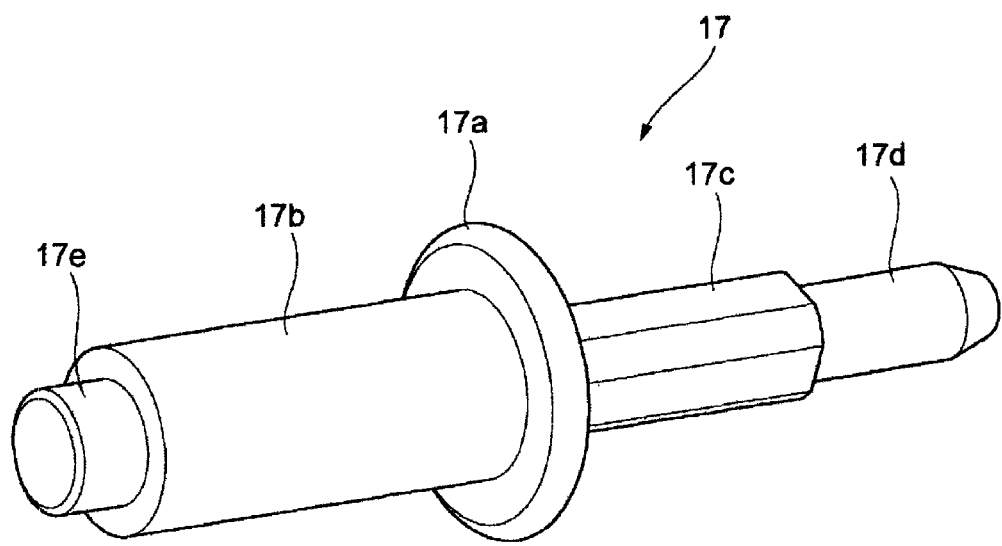
FIG. 4 is an enlarged perspective view of a first shaft in FIG. 1.
Figure 5:
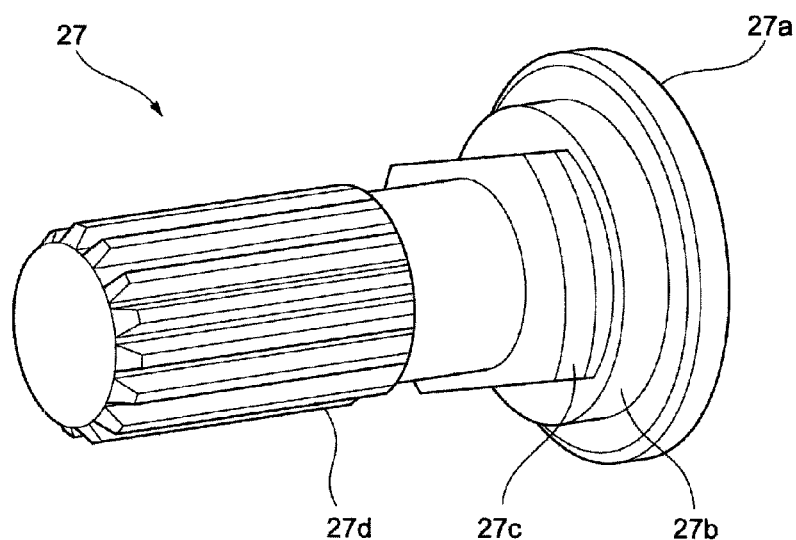
FIG. 5 is an enlarged perspective view of a second shaft in FIG. 1.
Figure 6:
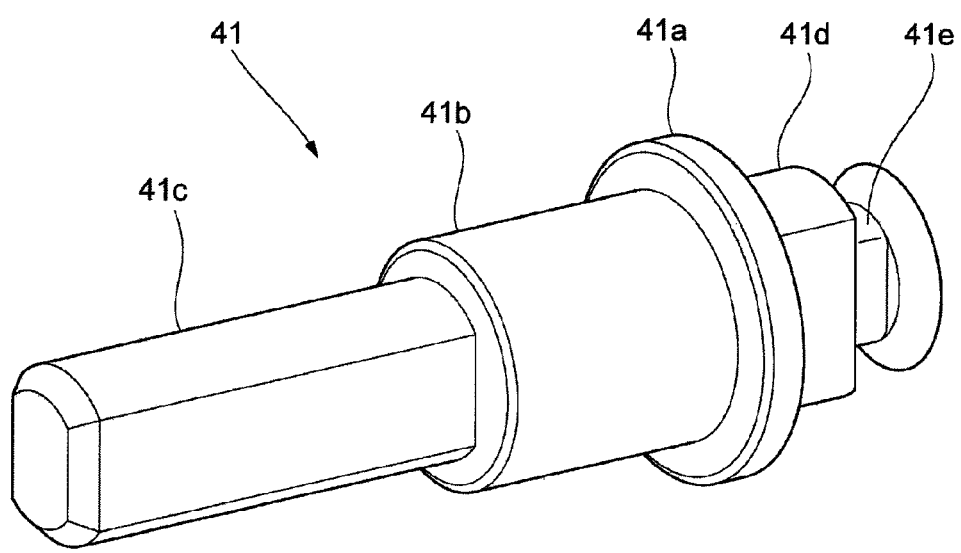
FIG. 6 is an enlarged perspective view of a third shaft in FIG. 1.
Figure 7:
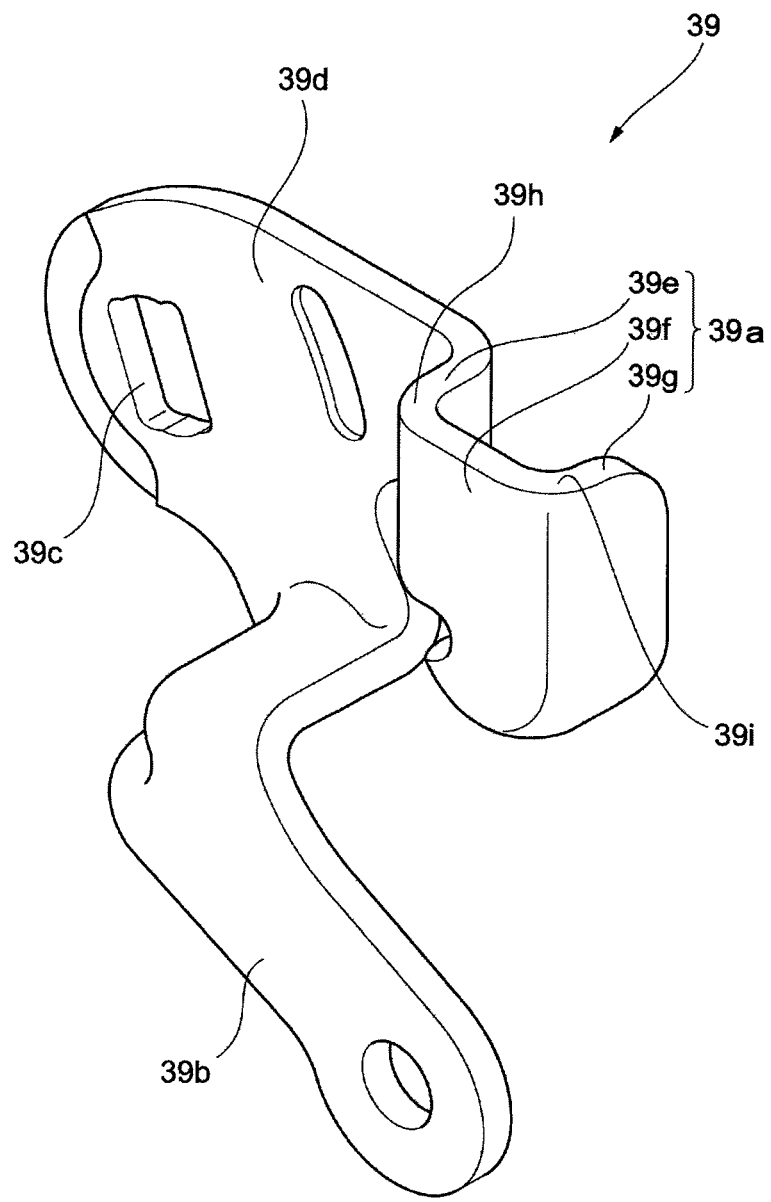
FIG. 7 is an enlarged perspective view of an operating lever in FIG. 1.
Figure 8:
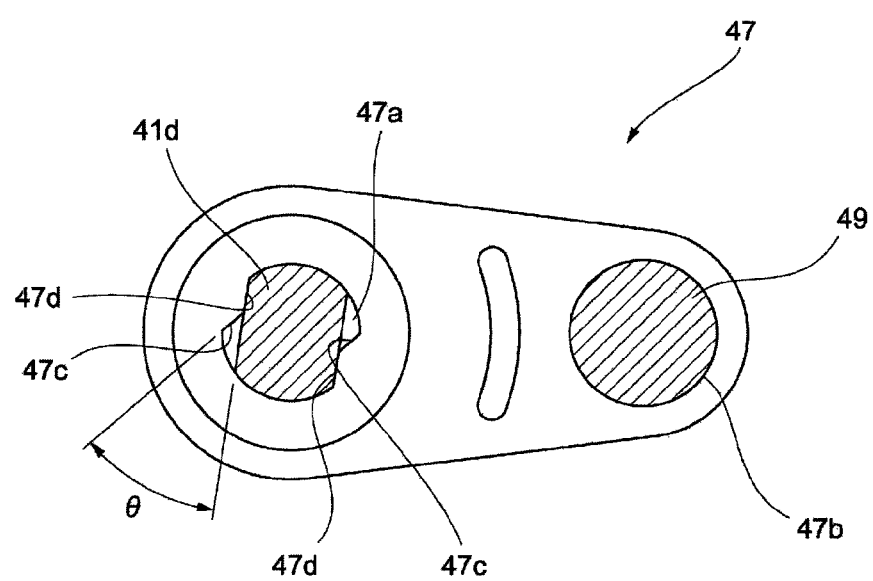
FIG. 8 is a view for explaining the fitting between the third shaft and a stopper lever in FIG. 1.

FIG. 1 is an exploded perspective view of the walk-in seat according to the present embodiment, FIG. 2 is a view taken along a direction of an arrow II in FIG. 1, FIG. 3 is a view taken along a direction of an arrow III in FIG. 1, FIG. 4 is an enlarged perspective view of a first shaft in FIG. 1, FIG. 5 is an enlarged perspective view of a second shaft in FIG. 1, FIG. 6 is an enlarged perspective view of a third shaft in FIG. 1, FIG. 7 is an enlarged perspective view of an operating lever in FIG. 1, and FIG. 8 is a view for explaining the fitting between the third shaft and a stopper lever in FIG. 1.

As shown in FIGS. 1 to 3, a lower arm 1 is provided on a seat cushion (2) side of a seat. The lower arm 1 includes a first lower arm 3 and a second lower arm 5 that is stacked on the first lower arm 3 along a seat width direction.

An upper arm 7 is provided on a seat back 4 side of the seat. The upper arm 7 is disposed at a side opposite to a face, which faces the first lower arm 3, of the second lower arm 5.

Further, the second lower arm 5 of the lower arm 1 is attached to the upper arm 7 via a reclining mechanism 9.

The reclining mechanism 9 shown in FIG. 1 is a well-known reclining mechanism that is referred to as a so-called round reclining mechanism.

The reclining mechanism 9 includes a first member 11, a plurality of poles disposed inside the first member 11, a second member 13, a cam mechanism, and a spring. In the first member 11, one face on which internal teeth are formed along a circumferential direction becomes an open face. Each of the poles has external teeth which are engageable with the internal teeth. The second member 13 is stacked on the open face side of the first member 11 and provided so as to be rotatable relative to the first member 11 in the circumferential direction. The second member 13 is formed with a guide portion for guiding the poles between a locked position where the external teeth are engaged with the internal teeth and an unlocked position where the external teeth are spaced apart from the internal teeth. The cam mechanism is provided between the first member 11 and the second member 13 and rotatably disposed on an axis of the relative rotation. When the cam mechanism is rotated in one direction, the poles are caused to move in a direction in which the external teeth are engaged with the internal teeth. When the cam mechanism is rotated in the other direction, the poles are caused to move in a direction in which the external teeth are spaced apart from the internal teeth. The spring directly or indirectly urges each of the poles in the direction in which the external teeth are engaged with the internal teeth.

Normally, due to an urging force of the spring, normally, the reclining mechanism 9 is in the locked state where the external teeth of the poles are engaged with the internal teeth of the first member 11, and the relative rotation between the first member 11 and the second member 13 is thus prohibited. Further, when the cam mechanism is actuated against the urging force of the spring and the external teeth of the poles are thus moved in a direction to be spaced apart from the internal teeth of the first member 11, the reclining mechanism 9 becomes the unlocked state where the relative rotation between the first member 11 and the second member 13 is allowed.

In the present embodiment, the first member 11 of the reclining mechanism 9 is attached to the upper arm 7, and the second member 13 of the reclining mechanism 9 is attached to the second lower arm 5 of the lower arm 1.

A plurality of convex portions 13a is formed along a circumferential direction of a circle centered on the axis of the relative rotation of the second member 13. A plurality of holes 5a is formed in the second lower arm 5. The plurality of convex portions 13a is respectively fitted into the plurality of holes 5a and then a welding operation or the like is performed thereon, so that the second member 13 and the second lower arm 5 are attached to each other. Further, the second lower arm 5 is formed with a hole 5b through which the axis of the relative rotation of the reclining mechanism 9 passes.

A plurality of convex portions (not shown) is formed along a circumferential direction of a circle centered on the axis of the relative rotation of the first member 11. A plurality of holes 7a is formed in the upper arm 7. The plurality of convex portions is respectively fitted into the plurality of holes 7a and then a welding operation or the like is performed thereon, so that the first member 11 and the upper arm 7 are attached to each other.

Further, the first member 11 of the reclining mechanism 9 is attached to the upper arm 7 and the second member 13 of the reclining mechanism 9 is attached to the second lower arm 5 of the lower arm 1, so that the reclining mechanism 9 is unlocked. Then, the upper arm 7 can be tilted relative to the lower arm 1 in the longitudinal direction.

The first lower arm 3 of the lower arm 1 is also formed with a hole 3b through which the axis of the relative rotation of the reclining mechanism 9 passes. The reclining mechanism 9 is provided with a sputter cover 15, which covers a spring 25 (to be described later) of the reclining mechanism 9 so that sputtering particles are not scattered and adhered to the spring 25 when the second member 13 of the reclining mechanism 9 is welded to the second lower arm 5.

One end of the first shaft 17 provided on the axis of the relative rotation is rotatably supported on the sputter cover 15. As shown in FIGS. 1 and 4, a medium-diameter portion 17b is formed in one side of the first shaft 17, with respect to a large-diameter portion 17a, and is supported on the sputter cover 15. It should be noted that the large-diameter portion 17a is abutted against the sputter cover 15 and configured to perform the positioning of one side in an axial direction of the first shaft 17. An oval-shaped portion 17c having an oval-shaped cross section is formed in the other side of the first shaft 17, with respect to the large-diameter portion 17a. In this disclosure, the oval-shape not only means shapes formed by sides and rounded corners, but also shapes except for a true circle. The oval-shaped portion 17c is inserted through the hole 3b of the first lower arm 3 and the hole 5b of the second lower arm 5 of the lower arm 1 and passes through a hole 13b formed in a central portion of the second member 13 of the reclining mechanism 9, so that the oval-shaped portion 17c is connected to an internal cam. A small-diameter portion 17d is formed continuously to the oval-shaped portion 17c. The small-diameter portion 17d is rotatably supported in a hole 7b of the upper arm 7. Further, a washer 18 is attached to the small-diameter portion 17d protruding from the hole 7b of the upper arm 7. The washer 18 is provided for preventing the detachment in the axial direction of the first shaft 17.

An attachment portion 17e is formed continuously to the medium-diameter portion 17b on one end side of the first shaft 17. The attachment portion 17e is fixed to a hole 19a formed in an open lever 19.

The open lever 19 is formed with an arcuate elongated hole 19c. A rod or the like is attached to the elongated hole 19c and transmits the movement of a reclining-lock releasing lever (not shown).

Further, a first spring hook 21 is attached to the face, faces the lower arm 1, of the upper arm 7. Further, a second spring hook 3a is formed on a peripheral edge of the hole 3b of the first lower arm 3 of the lower arm 1 and extends in the same direction as the first spring hook 21. Further, a coil spring 23 has an inner end locked to the second spring hook 3a of the first lower arm 1 and an outer end locked to the first spring hook 21 of the upper arm 7. Due to the by an urging force of the coil spring 23, the upper arm 7 is urged in a direction (a direction of an arrow "b" in FIG. 1) to be tiled forward.

Therefore, when the open lever 19 is rotated in a direction of an arrow "a" in FIG. 1, the internal cam of the reclining mechanism 9 is rotated via the first shaft 17, and thus the reclining mechanism 9 in the locked state is unlocked and the upper arm 7 is able to be tilted forward with respect to the lower arm 1.

A walk-in lever 25 is provided at a face opposite to the face, which faces the second lower arm 5, of the first lower arm 3 of the lower arm 1. The walk-in lever 25 has a first arm portion 25a, a second arm portion 25b and a third arm portion 25c. The walk-in lever 25 is rotated as a walk-in operation is performed. Further, the walk-in lever 25 is rotatably provided with respect to the lower arm 1 by using a second shaft 27. The second shaft 27 is fixed to an oval-shaped hole 25d formed in an intermediate portion of the walk-in lever 25 and is fitted into a hole 3c formed in the first lower arm 3.

As shown in FIGS. 1 and 5, in order from the second lower arm (5) side, the second shaft 27 has a large-diameter portion 27a, a medium-diameter portion 27b, an oval-shaped portion 27c having an oval-shaped cross section, and a small-diameter portion 27d. The large-diameter portion 27a abuts against an peripheral edge of the hole 3c of the first lower arm 3. The medium-diameter portion 27b is rotatably fitted into the hole 3c. The oval-shaped portion 27c is fitted into the oval-shaped hole 25d of the walk-in lever 25. The small-diameter portion 27d is processed to have a serration. A resin lever (not shown) which is operated by a user seated on a three-row seat is attached to the serration of the small-diameter portion 27d.

The second arm portion 25b of the walk-in lever 25 is formed with a hole 25d. A hole 31a is formed in one end of a connection rod 31. Further, the walk-in lever 25 and the connection rod 31 are rotatably attached to each other by a pin 29 and a pin 28. The pin 29 is inserted through the hole 31a of the connection rod 31 and the hole 25d of the second arm portion 25b of the walk-in lever 25, and the pin 28 is fitted to the pin 29 inserted therethrough.

An elongated hole 31b is formed in the other end of the connection rod 31. Further, the open lever 19 is formed with a hole 19b. The connection rod 31 and the open lever 19 are connected to each other by a pin 33 inserted through the elongated hole 31b of the connection rod 31 and the hole 19b of the open lever 19.

The first arm portion 25a of the walk-in lever 25 is connected with an inner cable 35a of a walk-in cable 35 (see FIGS. 2 and 3). The inner cable 35a is adapted to be pulled when a person seated on a three-row seat operates a lever (performs a walk-in operation) at the time of getting off.

An outer tube 35b of the walk-in cable 35 is locked to a semicircular notched groove 3e of the bracket portion 3d that is formed at a lower side of the first lower arm 3 of the lower arm 1.

One end of a spring 37 is locked to the bracket portion 3d and the other end thereof is locked to the third arm portion 25c of the walk-in lever 25. Further, the spring 37 causes the walk-in lever 25 to be urged in a direction of pulling the inner cable 35a of the walk-in cable 35.

An operating lever 39 is disposed at a face (i.e., a face on which the walk-in lever 25 is provided) opposite to the face, which faces the second lower arm 5, of the first lower arm 3 of the lower arm 1. As shown in FIG. 7, the operating lever 39 has a body portion 39d, a first arm portion (pressing arm portion) 39a and a second arm portion (fastening portion) 39b.

The first arm portion (pressing arm portion) 39a has an arm portion 39e extending in a direction away from the first lower arm 3 of the lower arm 1, a facing portion 39f bent from the arm portion 39e and facing the first lower arm 3 of the lower arm 1, and a pressing portion 39g bent from the facing portion 39e and extending in a direction approaching the first lower arm 3 of the lower arm 1, and the pressing portion 39g is pressed by the third arm portion 25c of the walk-in lever 25.

As shown in FIGS. 2 and 3, a first slide lock cable 36 and a second slide lock cable 38 are connected (fastened) to the second arm portion 39b of the operating lever 39, as an interlocking member. One ends of the first slide lock cable 36 and the second slide lock cable 38 are connected to an outer and inner slide rail lock mechanisms, and the other ends thereof are connected (fastened) to the second arm portion 39b of the operating lever 39.

An inner cable 36a of the first slide lock cable 36 and an inner cable 38a of the second slide lock cable 38 are connected to the second arm portion 39b of the operating lever 39. An outer tube 36b of the first slide lock cable 36 is locked to a first wire locking groove 5d formed in the second lower arm 5 of the lower arm 1. An outer tube 38b of the second slide lock cable 38 is locked to a second wire locking groove 5e formed in the second lower arm 5 of the lower arm 1.

The first lower arm 3 and the second lower arm 5 of the lower arm 1 are formed with a hole 3f and a hole 5c, respectively. A third shaft 41 is disposed parallel to a tilting center axis of the upper arm 7 and inserted through these holes 3f, 5c. The third shaft 41 is rotatably provided to the lower arm 1.

As shown in FIGS. 1 and 6, the third shaft 41 has a large-diameter portion 41a, a medium-diameter portion 41b and a first oval-shaped portion 41c having an oval-shaped cross section. The large-diameter portion 41a is located between the first lower arm 3 and the second lower arm 5 of the lower arm 1 and abutted against a peripheral edge of the hole 3f of the first lower arm 3. The medium-diameter portion 41b is formed at one side of the third shaft 41, with respect to the large-diameter portion 41a and inserted through the hole 3f of the first lower arm 3. The first oval-shaped portion 41c is fitted into an oval-shaped hole 39c of the body portion 39d of the operating lever 39. The first oval-shaped portion 41c of the third shaft 41 is fitted into the oval-shaped hole 39c of the operating lever 39, so that the operating lever 39 and the third shaft 41 are rotated together with each other.

A retaining washer 43 is attached to the first oval-shaped portion 41c of the third shaft 41 that is inserted through the hole 39c of the operating lever 39. Further, an inner end of a spring 45 is locked to the first oval-shaped portion 41c of the third shaft 41. An outer end of the spring 45 is locked to a spring locking portion 3g. The spring locking portion 3g is formed by cutting and raising a portion of the first lower arm 3 of the lower arm 1.

Further, the spring 45 causes the operating lever 39 to be urged in a direction in which the first arm portion 39a approaches the third arm portion 25c of the walk-in lever 25.

A second oval-shaped portion 41d having an oval-shaped cross section is formed in the other side of the third shaft 41, with respect to the large-diameter portion 41a.

A stopper lever 47 is disposed between the first lower arm 3 and the second lower arm 5 of the lower arm 1. A first hole 47a is formed in one end of the stopper lever 47 and a second hole 47b is formed in the other end thereof. The second oval-shaped portion 41d of the third shaft 41 is fitted into the first hole 47a.

A stopper pin (stopper portion) 49 is attached to the second hole 47b of the stopper lever 47. The stopper pin 49 extends in a direction (a direction intersecting with a rotation plane of the stopper lever 47) substantially perpendicular to the stopper lever 47. The stopper pin 49 is inserted through an arcuate elongated hole (insertion hole) 5f formed in the second lower arm 5 of the lower arm 1 and is projected to the outside of the lower arm 1. It should be noted that the elongated hole 5f is a circular arc coaxial with the center of the hole 5c.

As shown in FIG. 8, the first hole 47a of the stopper lever 47 is formed in a shape that has a play of θ in a rotation direction when the second oval-shaped portion 41d of the third shaft 41 is fitted into the first hole 47a of the stopper lever 47. In the present embodiment, θ is set to be equal to 45 degrees.

When the third shaft 41 to be fitted is rotated in the clockwise direction, the stopper lever 47 does not rotate in the clockwise direction until the second oval-shaped portion 41d of the third shaft 41 is abutted against two first abutting surfaces 47c of the first hole 47a. Further, when the third shaft 41 to be fitted is rotated in the counterclockwise direction, the stopper lever 47 does not rotate in the counterclockwise direction until the second oval-shaped portion 41d of the third shaft 41 is abutted against two second abutting surfaces 47d of the first hole 47a.

Further, the spring 45 causes the operating lever 39 to be urged in a direction in which the first arm portion 39a of the operating lever 39 approaches the third arm portion 25c of the walk-in lever 25.

A third oval-shaped portion 41e is formed continuously to the second oval-shaped portion 41d of the third shaft 41. The third oval-shaped portion 41e is inserted through the hole 5c of the second lower arm 5 of the lower arm 1 and projected to the outside of the lower arm 1. Further, a rotation facilitating lever 51 is attached to the third oval-shaped portion 41e projected to the outside of the lower arm 1.

Therefore, the operating lever 39 and the rotation facilitating lever 51 are rotated together with the third shaft. The stopper lever 47 is rotated together with the third shaft when the play in the rotation direction is eliminated.

A restriction portion 7c is formed in a lower side of the upper arm 7. The restriction portion 7c is abutted against the stopper pin 49 and restricts the forward tilting operation of the upper arm 7 to a predetermined amount.

Further, a pressing portion 7d is formed in the lower side of the upper arm 7. The pressing portion 7d can press the rotation facilitating lever 51 when the upper arm 7 is tilted forward.

The pressing portion 7d has a pressing face 7e and a holding face 7f. The pressing face 7e presses and rotates the rotation facilitating lever 51. When the rotation facilitating lever 51 is rotated by the predetermined amount, the holding face 7f is in sliding contact with the rotation facilitating lever 51 so as to prevent further rotation of the rotation facilitating lever 51 and to hold such state.

Next, an operation of the above configurations will be described.

1. Walk-In Operation

Figure 9:
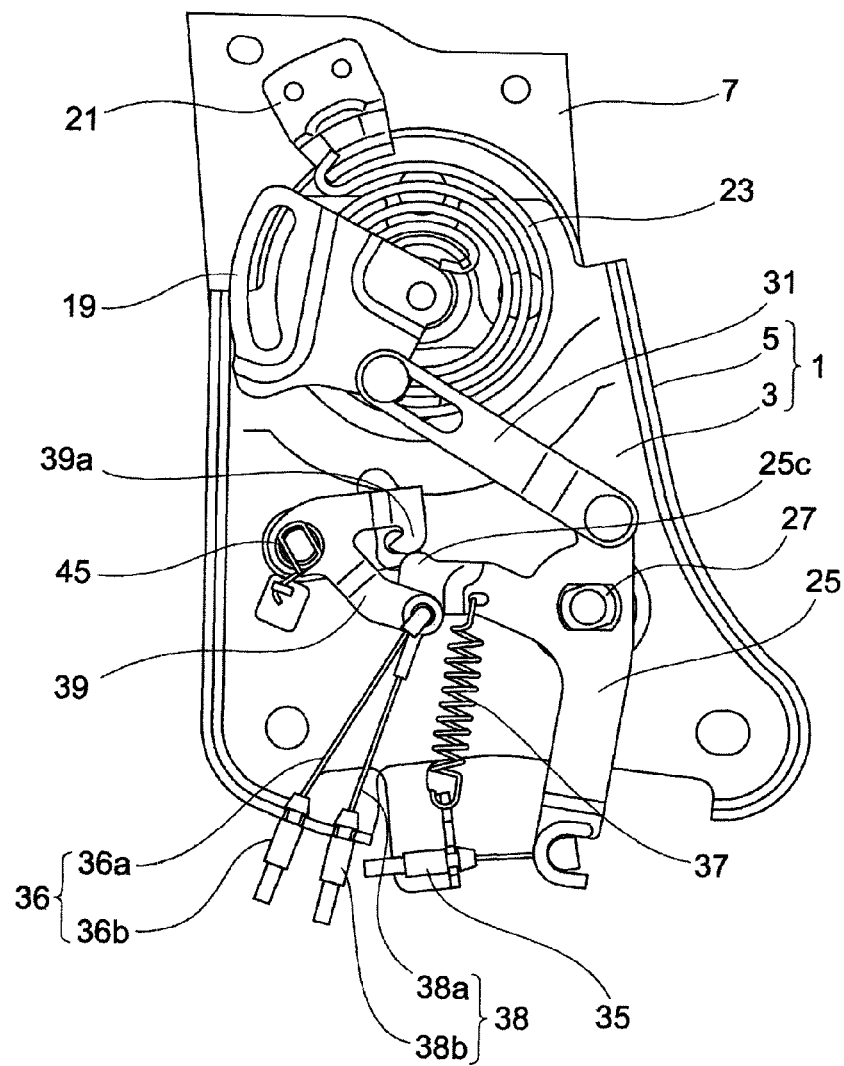
FIG. 9 is a view showing a state immediately after a walk-in operation is started from the state shown in FIG. 2.
Figure 10:
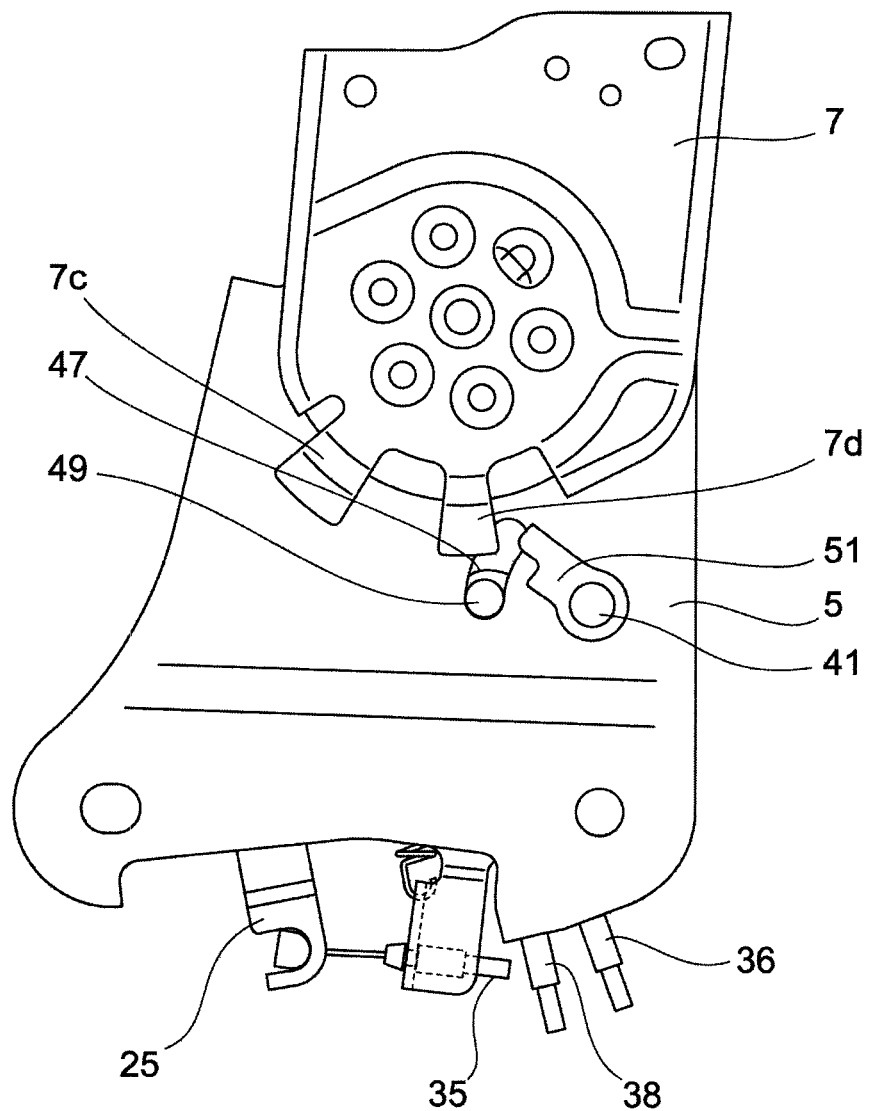
FIG. 10 is a view showing a state immediately after a walk-in operation is started from the state shown in FIG. 3.
Figure 11:
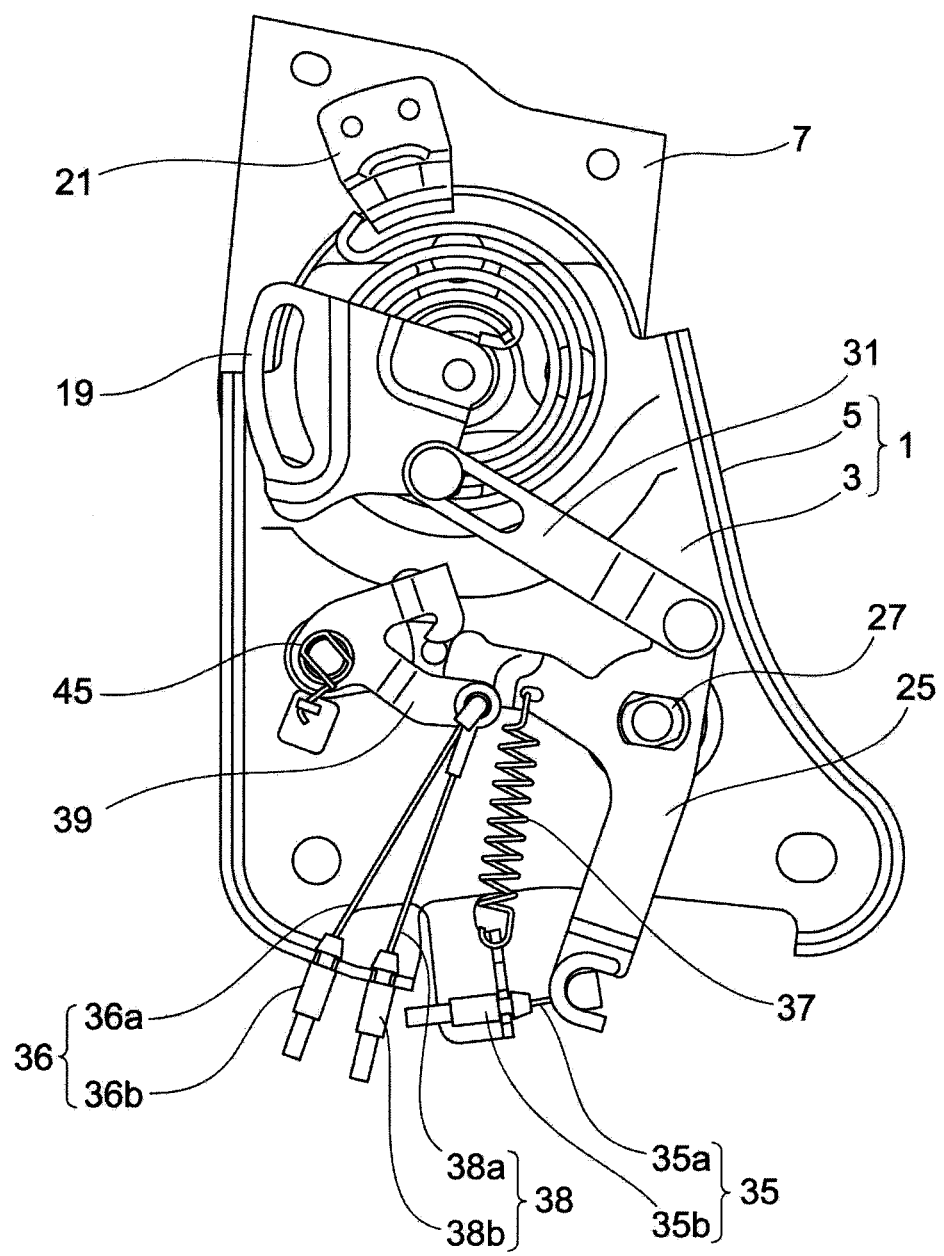
FIG. 11 is a view showing a state immediately after an upper arm starts to be tilted forward from the state shown in FIG. 9.
Figure 12:
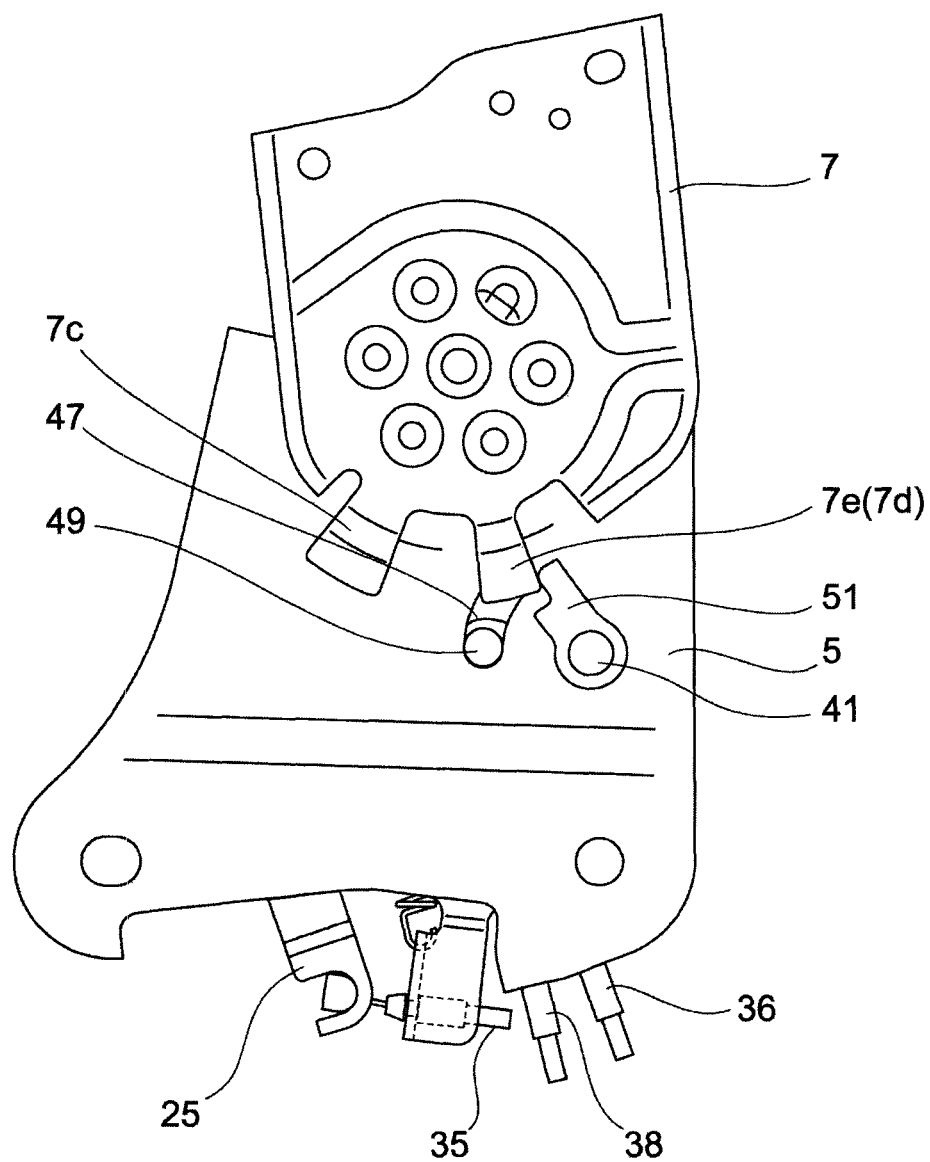
FIG. 12 is a view showing a state immediately after an upper arm starts to be tilted forward from the state shown in FIG. 10.
Figure 13:
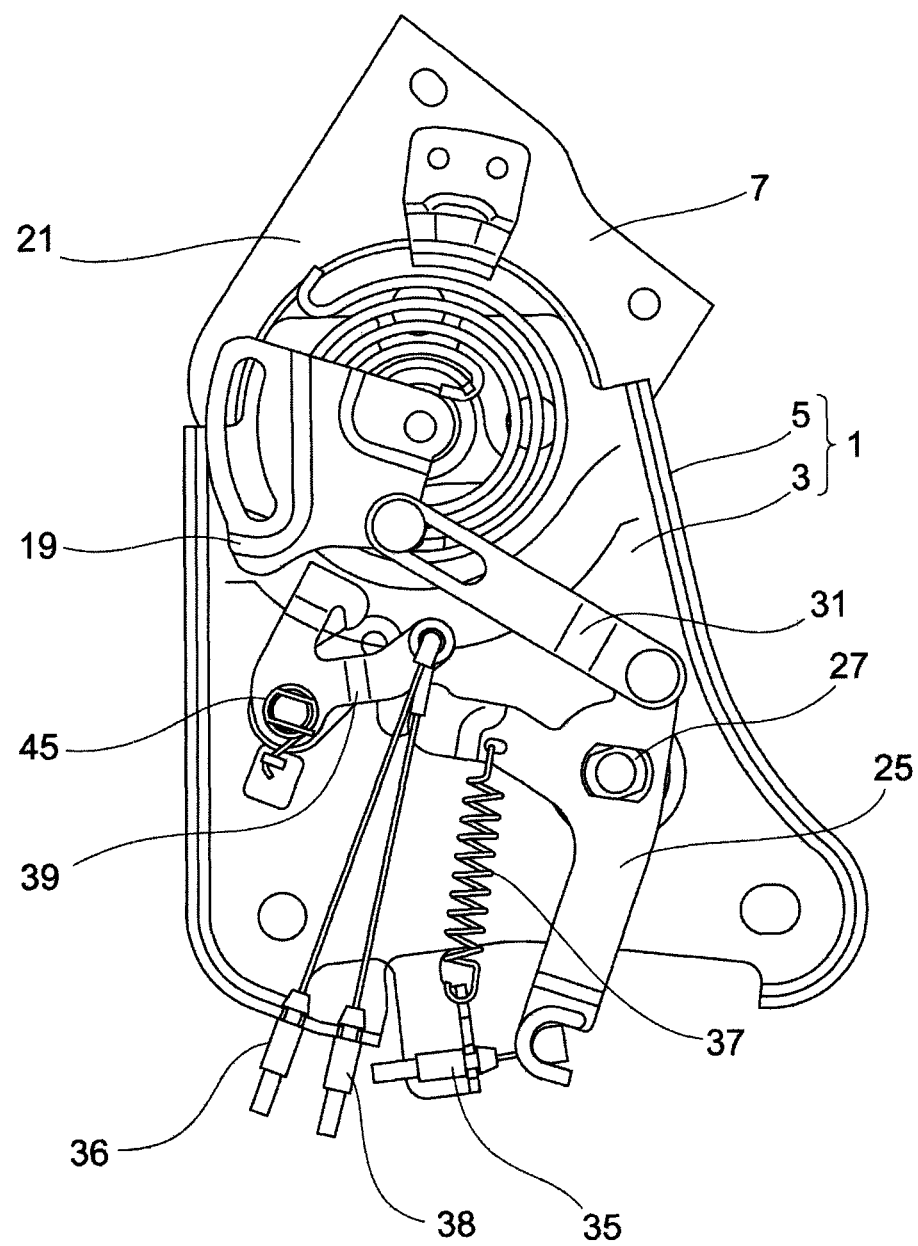
FIG. 13 is a view showing a state where a walk-in operation is completed from the state shown in FIG. 11.
Figure 14:
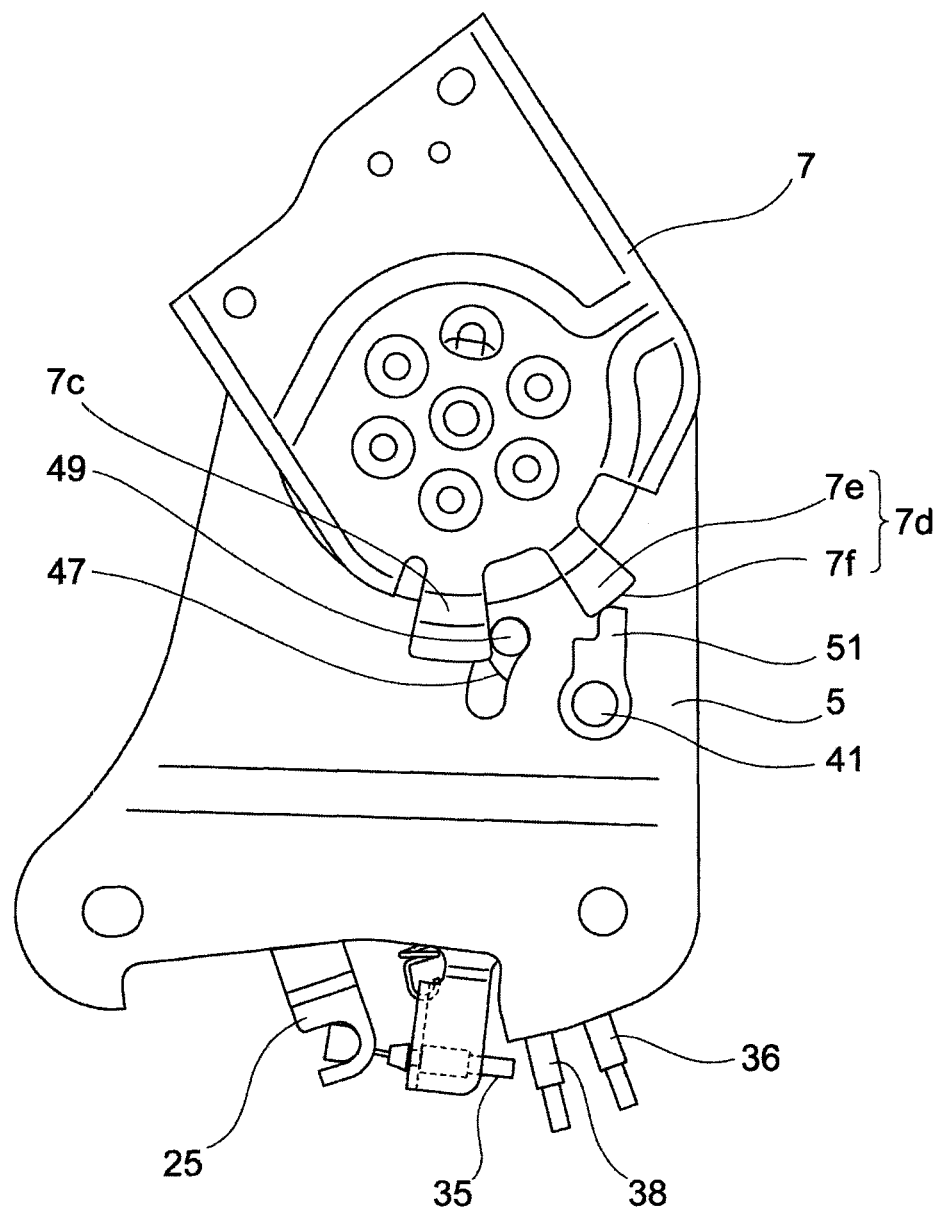
FIG. 14 is a view showing a state where a walk-in operation is completed from the state shown in FIG. 12.

FIG. 9 is a view showing a state immediately after a walk-in operation is started from the state shown in FIG. 2, FIG. 10 is a view showing a state immediately after a walk-in operation is started from the state shown in FIG. 3, FIG. 11 is a view showing a state immediately after an upper arm starts to be tilted forward from the state shown in FIG. 9, FIG. 12 is a view showing a state immediately after the upper arm starts to be tilted forward from the state shown in FIG. 10, FIG. 13 is a view showing a state where a walk-in operation is completed from the state shown in FIG. 11, and FIG. 14 is a view showing a state where a walk-in operation is completed from the state shown in FIG. 12.

(Locked State)

The state shown in FIGS. 2 and 3 refers to a state where the walk-in operation is not performed and the reclining mechanism 9 is locked.

By the urging force of the spring 45, the operating lever 39 is urged in a direction in which the first arm portion 39a approaches the third arm portion 25c of the walk-in lever 25. The play in the rotation direction is eliminated between the third shaft 41 and the stopper lever 47. The stopper lever 47 is rotated together with the third shaft 41 by being pressed by the second oval-shaped portion 41d of the third shaft 41. Further, the stopper pin 49 of the stopper lever 47 is abutted against a lower end of the arcuate elongated hole 5f serving as a stopper (see FIG. 3).

Further, the rotation facilitating lever 51 is located at a position that does not interfere with the pressing portion 7d of the upper arm 7.

Furthermore, the outer and inner slide rail lock mechanisms are in the locked state.

(Immediately After Walk-in Operation is Started)

Here, upon pulling the inner cable 35a of the walk-in cable 35 against the urging force of the spring 37, the walk-in lever 25 is rotated in the clockwise direction (arrow direction) in FIG. 2.

As shown in FIGS. 9 and 10, when the walk-in lever 25 is rotated, the open lever 19 is rotated via the connection rod 31. Further, the internal cam of the reclining mechanism 9 is rotated via the first shaft 17 that is connected to the open lever 19. In this way, the reclining mechanism 9 is unlocked.

Further, when the walk-in lever 25 is rotated, the third arm portion 25c presses the first arm portion 39a of the operating lever 39. The operating lever 39 pulls the inner cable 36a of the first slide lock cable 36 and the inner cable 38a of the second slide lock cable 38, so that an unlocking operation of the outer and inner slide rail lock mechanisms is started.

Furthermore, when the operating lever 39 is rotated, the third shaft 41 is also rotated. The rotation facilitating lever 51 is moved to a position where the rotation facilitating lever 51 interferes with the pressing face 7e of the pressing portion 7d of the upper arm 7.

In this state, the stopper lever 47 that has a play in the rotation direction with respect to the third shaft 41 does not rotate, and the stopper pin 49 is abutted against the lower end of the arcuate elongated hole 5f serving as a stopper (see FIG. 10).

(Immediately After Upper Arm is Started to be Tilted Forward)

As shown in FIGS. 11 and 12, the upper arm 7 is tilted forward by the urging force of the coil spring 23 when the reclining mechanism 9 is unlocked.

Then, the forward tilting of the upper arm 7 causes the pressing face 7e of the pressing portion 7d of the upper arm 7 to push and rotate the rotation facilitating lever 51. Therefore, the third shaft 41 and the operating lever 39 rotating together with the third shaft 41 are further rotated. As the operating lever 39 is further rotated, the unlocking operation of the outer and inner slide rail lock mechanisms is continued.

Also in this state, the stopper lever 47 that has a play in the rotation direction with respect to the third shaft 41 does not rotate, and the stopper pin 49 is abutted against the lower end of the arcuate elongated hole 5f serving as a stopper (see FIG. 12).

(Completion of Walk-in Operation)

When the upper arm 7 is further tilted forward from the state shown in FIGS. 11 and 12, the rotation facilitating lever 51 is further rotated by the pressing face 7e of the pressing portion 7d of the upper arm 7. In this way, the third shaft 41 rotating together with the rotation facilitating lever 51 and the operating lever 39 rotating together with the third shaft 41 are further rotated.

Further, as shown in FIGS. 13 and 14, the play in the rotation direction is eliminated between the stopper lever 47 and the third shaft 41, and the stopper lever 47 is rotated together with the third shaft 41. The stopper pin 49 provided to the stopper lever 47 is moved upward from the lower end of the arcuate elongated hole 5f, so that the stopper pin 49 can be abutted against the restriction portion 7c of the upper arm 7.

At this time, as shown in FIG. 14, the rotation facilitating lever 51 is in sliding contact with the pressing face 7f of the pressing portion 7d of the upper arm 7. The rotation facilitating lever 51 that is rotated by a predetermined amount is held in a state where the rotation facilitating lever 51 is not further rotated.

Further, the restriction portion 7c of the upper arm 7 is tilted forward and abutted against the stopper pin 49, so that the forward tilting operation of the upper arm 7 is restricted to a predetermined amount.

As the operating lever 39 is further rotated, the unlocking operation of the outer and inner slide rail lock mechanisms is completed. The lock mechanisms are in the unlocked state and the seat can be moved in the longitudinal direction.

2. Normal Reclining

A reclining-lock releasing lever (not shown) is operated, so that only the open lever 19 is operated to rotate in a direction of an arrow "a" in FIG. 1.

As the open lever 19 is rotated, the first shaft 17 is rotated and the reclining mechanism is unlocked.

At this time, even when the open lever 19 is rotated in the direction of the arrow "a," the rotation of the open lever 19 is not transmitted to the walk-in lever 25 by an idling mechanism. The idling mechanism is configured by the fitting between the pin 33 of the open lever 19 and the elongated hole 31b of the connection rod 31. Therefore, the stopper pin 49 is in a position that does not interfere with the restriction portion 7c of the upper arm 7. As a result, the seat back can be tilted forward such that the seat back is overlapped on the seating face of the seat cushion.

According to the above configurations, the following effects can be obtained.

(1) A play in the rotation direction is formed between the third shaft 41 and the stopper lever 47 having the stopper pin 49. The stopper lever 47 starts to rotate with a delay corresponding to the play with respect to the third shaft 41.

Therefore, since the rotation amount of the stopper lever 47 is smaller than that of the operating lever 39 and the third shaft 41, it is possible to reduce the size of the arcuate elongated hole (insertion hole) 5f through which the stopper pin 49 is inserted. As a result, it is possible to suppress the strength reduction of the lower arm 1.

(2) By changing the length of the pressing face 7e of the pressing portion 7d of the upper arm 7 in the rotation radius direction of the upper arm 7, it is possible to appropriately change the timing when the rotation facilitating lever 51 is switched from a pressing face to a holding face. As a result, the operation amount of the first slide lock cable 36 and the second slide lock cable 38, as an interlocking member, can be adjusted to an appropriated amount.

(3) As shown in FIG. 7, the operating lever 39 has the body portion 39d, the first arm portion (pressing arm portion) 39a and the second arm portion (fastening portion) 39b. The body portion 39d is formed with the hole 39c through which a rotation center axis passes. The first arm portion 39a is pressed by the third arm portion 25c of the walk-in lever 25. The other ends of the first slide lock cable 36 and the second slide lock cable 38, as an interlocking member, are connected (fastened) to the second arm portion 39b.

According to appropriately setting the length of the first arm portion (pressing arm portion) 39a, it is possible to reduce a force for rotating the operating lever 39.

Further, according to appropriately setting the length of the second arm portion (fastening portion) 39b, it is possible to increase the operation amount of the inner cable 36a of the first slide lock cable 36 and the inner cable 38a of the second slide lock cable 38, as an interlocking member.

Further, the first arm portion (pressing arm portion) 39a has the arm portion 39e extending in a direction away from the first lower arm 3 of the lower arm 1, the facing portion 39f bent from the arm portion 39e and facing the first lower arm 3 of the lower arm 1, and the pressing portion 39g bent from the facing portion 39e and extending in a direction approaching the first lower arm 3 of the lower arm 1. The pressing portion 39g is pressed by the third arm portion 25c of the walk-in lever 25.

As shown in FIG. 7, in the first arm portion 39a, both a bent portion 39h between the arm portion 39e and the facing portion 39f and a bent portion 39i between the facing portion 39f and the pressing portion 39g are formed as an R portion (curved portion). Since these bent portions 39h, 39i are located at positions spaced apart from the lower arm 1, the pressing portion 39g can be placed on the lower arm 1 side. Therefore, the third arm portion 25c of the walk-in lever 25 for pressing the pressing portion 39g can be also placed on the lower arm 1 side. As a result, the operating lever 39 and the walk-in lever 25 can be placed in the vicinity of the lower arm 1, so that the operating lever 39, and the upper arm 7 and the lower arm 1 of the walk-in lever 25 can be placed with a small thickness in a tilting axis direction of the upper arm 7.

(4) The stopper lever 47 is disposed between the first lower arm 3 and the second lower arm 5. The stopper pin (stopper portion) 49 provided to the stopper lever 47 is projected to the outside through the elongated hole (insertion hole) 5f formed in the second lower arm 5. Accordingly, the stopper pin 49 can be abutted against the restriction portion 7c of the upper arm 7.

In this way, the portion (base of the stopper pin 49) of the stopper lever 47 on which the stopper pin 49 is provided is disposed near the second lower arm 5. The contact portion of the stopper pin 49 with the restriction portion 7c of the upper arm 7 is set near the elongated hole 5f. Therefore, the contact portion between the restriction portion 7c and the stopper pin 49 can be set near the base of the stopper pin 49. As a result, it is possible to prevent a large bending stress from occurring at the base of the stopper pin 49 when the restriction portion 7c is abutted against the stopper pin 49.

Meanwhile, this disclosure is not limited to the above embodiments but the following embodiments can be realized.

(1) In the above embodiments, the stopper pin 49 is separately provided to the stopper lever 49. However, the stopper pin 49 may be formed together with the stopper lever 47.

(2) In the above embodiments, the restriction portion 7c and the pressing portion 7d are formed together with the upper arm 7. However, a restriction member and a pressing member may be separately attached to the upper arm 7.

What is claimed is:

1. A walk-in seat comprising:
a lower arm, which is provided to a seat cushion side of a seat that is provided on a slide rail;
an upper arm, which is provided to a seat back side of the seat and provided to be tiltable with respect to the lower arm;
a reclining mechanism, which is configured to lock-and-unlock a tilting of the upper arm;
a walk-in lever, which is rotatably provided to the lower arm and rotated by a walk-in operation to cause the reclining mechanism to be unlocked;
a shaft, which is disposed in parallel with a center axis of the tilting and rotatably provided to the lower arm;
an operating lever, which is attached to the shaft to rotate together with the shaft and rotated with interlocking with the walk-in lever that is rotated by the walk-in operation;
a rotation facilitating lever, which is attached to the shaft to rotate together with the shaft and causes the shaft and the operating lever to further rotate with interlocking with a forward tilting operation of the upper arm;
a stopper lever, which is held in the shaft with a play in a rotation direction and has a stopper portion extending in a direction intersecting with a rotation plane;
an insertion hole, which is formed in the lower arm, the stopper portion being inserted through the insertion hole;
a restriction portion, which is provided to the upper arm and abutted against the stopper portion to restrict the forward tilting operation of the upper arm to a predetermined amount; and
an interlocking member, which interlocks the operating lever with a lock mechanism of the slide rail.

2. The walk-in seat according to claim 1,
wherein the upper arm is provided with a pressing portion that is able to press the rotation facilitating lever, and
wherein the pressing portion has:
a pressing face, which is configured to press and rotating the rotation facilitating lever; and
a holding face, which is in sliding contact with the rotation facilitating lever to prevent further rotation of the rotation facilitating lever, which has rotated by the predetermined amount, and hold a state where the rotation facilitating lever has rotated by the predetermined amount.

3. The walk-in seat according to claim 2,
wherein the operating lever has:
a body portion, which is attached to the shaft;
a fastening portion, to which the interlocking member is fastened; and
a pressing arm portion, which is pressed against the walk-in lever, and
wherein the pressing arm portion has:
an arm portion, which is extending in a direction away from the lower arm;
a facing portion, which is bent from the arm portion and faces the lower arm; and
a pressing portion, which is bent from the facing portion and extending in a direction approaching the lower arm and which is pressed by the walk-in lever.

4. The walk-in seat according to claim 1,
wherein the operating lever has:
a body portion, which is attached to the shaft;
a fastening portion, to which the interlocking member is fastened; and
a pressing arm portion, which is pressed against the walk-in lever, and
wherein the pressing arm portion has:
an arm portion, which is extending in a direction away from the lower arm;
a facing portion, which is bent from the arm portion and faces the lower arm; and
a pressing portion, which is bent from the facing portion and extending in a direction approaching the lower arm and which is pressed by the walk-in lever.

5. The walk-in seat according to claim 2,
wherein the lower arm has a first lower arm and a second lower arm disposed on a side closer to an upper arm than the first lower, wherein the stopper lever is disposed between the first lower arm and the second lower arm, and wherein the stopper portion is projected to the outside through the insertion hole formed in the second lower arm and is able to be abutted against the restriction portion.

6. The walk-in seat according to claim 1, wherein the lower arm has a first lower arm and a second lower arm disposed on a side closer to an upper arm than the first lower, wherein the stopper lever is disposed between the first lower arm and the second lower arm, and wherein the stopper portion is projected to the outside through the insertion hole formed in the second lower arm and is able to be abutted against the restriction portion.

\* \* \* \* \*

UNITED STATES PATENT AND TRADEMARK OFFICE
CERTIFICATE OF CORRECTION

Page 1 of 1

PATENT NO. : 9,969,302 B2
APPLICATION NO. : 14/852324
DATED : May 15, 2018
INVENTOR(S) : Nobumasa Higashi It is certified that error appears in the above-identified patent and that said Letters Patent is hereby corrected as shown below:

On the Title Page

After "(65) Prior Publication Data
US 2017/0072817 A1 Mar. 16, 2017"

Please insert:
-- (30) Foreign Application Priority Data
Sep. 12, 2014 (JP) ............................ 2014-186517 --

Signed and Sealed this
Twenty-eighth Day of August, 2018

Andrei Iancu
*Director of the United States Patent and Trademark Office*